US010652749B2

(12) United States Patent
Derakhshani

(10) Patent No.: US 10,652,749 B2
(45) Date of Patent: *May 12, 2020

(54) SPOOF DETECTION USING PROXIMITY SENSORS

(71) Applicant: EyeVerify Inc., Kansas City, MO (US)

(72) Inventor: Reza R. Derakhshani, Shawnee, KS (US)

(73) Assignee: EyeVerify Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,233

(22) Filed: Sep. 21, 2018

(65) Prior Publication Data

US 2019/0037408 A1    Jan. 31, 2019

Related U.S. Application Data

(63) Continuation of application No. 15/446,564, filed on Mar. 1, 2017, now Pat. No. 10,111,103.

(60) Provisional application No. 62/302,526, filed on Mar. 2, 2016.

(51) Int. Cl.
| | | |
|---|---|---|
| *H04W 12/12* | (2009.01) | |
| *G06K 9/00* | (2006.01) | |
| *G06K 9/20* | (2006.01) | |
| *H04W 4/80* | (2018.01) | |
| *G06K 9/52* | (2006.01) | |
| *H04W 4/02* | (2018.01) | |

(52) U.S. Cl.
CPC ........ *H04W 12/12* (2013.01); *G06K 9/00107* (2013.01); *G06K 9/00268* (2013.01); *G06K 9/00288* (2013.01); *G06K 9/00899* (2013.01); *G06K 9/2027* (2013.01); *G06K 9/52* (2013.01); *H04W 4/023* (2013.01); *H04W 4/80* (2018.02)

(58) Field of Classification Search
CPC .... H04W 12/12; H04W 4/80; G06K 9/00107; G06K 9/00268; G06K 9/00288; G06K 9/00899
See application file for complete search history.

(56) References Cited

U.S. PATENT DOCUMENTS

| | | | |
|---|---|---|---|
| 8,396,265 B1 | 3/2013 | Ross et al. | |
| 8,457,367 B1 | 6/2013 | Sipe et al. | |
| 8,700,137 B2 | 4/2014 | Albert | |

(Continued)

FOREIGN PATENT DOCUMENTS

| | | |
|---|---|---|
| CN | 102622588 A | 8/2012 |
| CN | 104537292 A | 4/2015 |

(Continued)

OTHER PUBLICATIONS

U.S. Appl. No. 14/672,629, Published as US2015/0288688, Bio Leash for User Authentication, filed Mar. 30, 2015.

(Continued)

*Primary Examiner* — Nabil H Syed
(74) *Attorney, Agent, or Firm* — Goodwin Procter LLP

(57) ABSTRACT

Computer-implemented methods and systems for liveness analysis using proximity sensors are described. Reflective strength readings from a proximity sensor, such as an infrared proximity sensor incorporated in a mobile device, are received. A liveness measure is determined based on the one or more readings and a reflection threshold, and, based on the liveness measure, a determination is made whether a target in range of the proximity sensor is likely to be a live human.

20 Claims, 2 Drawing Sheets

(56) References Cited

U.S. PATENT DOCUMENTS

| | | | |
|---|---|---|---|
| 8,978,117 | B2 | 3/2015 | Bentley et al. |
| 9,202,105 | B1 | 12/2015 | Wang et al. |
| 9,231,765 | B2 | 1/2016 | Flautner et al. |
| 9,251,427 | B1 | 2/2016 | Chu et al. |
| 9,396,537 | B2 | 7/2016 | Hirvonen |
| 9,665,784 | B2 | 5/2017 | Derakhshani et al. |
| 10,108,871 | B2 | 10/2018 | Derakhshani et al. |
| 2009/0232361 | A1 | 9/2009 | Miller |
| 2013/0102283 | A1 | 4/2013 | Lau et al. |
| 2013/0198832 | A1 | 8/2013 | Draluk et al. |
| 2013/0251215 | A1 | 9/2013 | Coons |
| 2013/0324081 | A1 | 12/2013 | Gargi et al. |
| 2014/0198620 | A1 | 7/2014 | Prausse et al. |
| 2014/0372762 | A1 | 12/2014 | Flautner et al. |
| 2015/0161434 | A1 | 6/2015 | Ross et al. |
| 2015/0186711 | A1 | 7/2015 | Baldwin et al. |
| 2015/0288688 | A1 | 10/2015 | Derakhshani |
| 2015/0294108 | A1 | 10/2015 | Kim et al. |
| 2016/0007935 | A1 | 1/2016 | Hernandez et al. |

FOREIGN PATENT DOCUMENTS

| | | |
|---|---|---|
| CN | 104915649 A | 9/2015 |
| JP | 2005/296463 A | 10/2005 |
| JP | 2006/079427 A | 3/2006 |
| JP | 2010/282322 A | 12/2010 |
| JP | 2011/205240 A | 10/2011 |
| JP | 2013/534652 A | 9/2013 |
| JP | 2014/184002 A | 10/2014 |
| JP | 2015/054223 A | 3/2015 |
| RU | 56668 U1 | 9/2006 |
| RU | 2296599 C2 | 4/2007 |
| WO | WO-2010/085393 A3 | 9/2010 |
| WO | WO-2012/024436 A1 | 2/2012 |
| WO | WO-2015/157021 | 10/2015 |
| WO | WO-2016/204968 A1 | 12/2016 |

OTHER PUBLICATIONS

U.S. Appl. No. 15/169,107, now U.S. Pat. No. 9,665,784, Published as US2016/0371555, Systems and Methods for Spoof Detection and Liveness Analysis, filed May 31, 2016.

U.S. Appl. No. 15/498,797, Systems and Methods for Spoof Detection and Liveness Analysis, filed Apr. 27, 2017.

Anjos A and Marcel S, (2011), 'Counter-Measures to Photo Attacks in Face Recognition: A Public Database and a Baseline,' Proc IEEE International Joint Conference on Biometrics (IJCB), Washington, DC, Oct. 11-13, 2011, IEEE Computer Society, Washington, DC (Pub), (7 pages).

Anjos A et al., 'Chapter 4: Face Anti-Spoofing: Visual Approach,' *Handbook of Biometric Anti-Spoofing*, (1st Ed, 2014), S Marcel et al., (eds), Springer-Verlag, London, UK (pub), pp. 65-82.

Anonymous, 'Android Jelly Bean Face Unlock 'Liveness Check' Bypassed with Photo Editing,' Aug. 5, 2012 Ed, International Business Times, New York, NY, accessed on the internet at <http://www.ibtimes.co.uk/androidjellybeanfaceunlockhackedphotoediting370426_on_May 24>, 2016 (3 pages).

Anonymous, (2016), 'Proximity and Ambient Light Sensing (ALS) Module,' Datasheet for Model No. VL6180X, Document No. ID026171 Rev 7, Mar. 2016, STMicroelectronics NV, Geneva, CH (pub), (87 pages), downloaded from the internet on May 30, 2017 from <http://www.st.com/content/ccc/resource/technical/document/datasheet/c4/11/28/86/e6/26/44/b3/DM00112632.pdf/files/DM00112632.pdf/jcr:content/translations/en.DM00112632.pdf.

Bao W et al., (2009), 'A Liveness Detection Method for Face Recognition Based on Optical Flow Field,' Proc 2009 International Conference on Image Analysis and Signal Processing, Taizhou, China Apr. 11-12, 2009, IEEE Cat. No. CFP0968G-PRT, IEEE Computer Society Press, Picataway, NJ (Pub), 1:233-6.

Bharadwaj S et al., (2013), 'Computationally Efficient Face Spoofing Detection with Motion Magnification,' Proc 2013 IEEE Conference on Computer Vision and Pattern Recognition Workshops, Washington, DC, Jun. 23-28, 2013, IEEE Computer Society, Washington, DC (Pub), 1:105-10.

Chingovska I et al., 'Chapter 8: Face Recognition Systems Under Spoofing Attacks,' *Face Recognition Across the Imaging Spectrum*, (1st Ed, 2016), T Bourlai (ed), Springer International Publishing, New York, NY (pub), pp. 165-194.

Chingovska I et al., (2012), 'On the Effectiveness of Local Binary Patterns in Face Anti-Spoofing,' Proc of the Biometrics Special Interest Group (BIOSIG), Sep. 6-7, 2012, Darmstadt, Germany, IEEE Computer Society, Washington, DC (Pub), 1:1-7.

Cho DH et al., (2005), 'Real-time Iris localization for Iris Recognition in Cellular Phone,' Proc 6th International Conference on Software Engineering, artificial Intelligence Network and Parallel/Distributed Computing, Towson University, MD, May 23-25, 2005, IEEE Computer Society, Washington, DC (Pub), 1:254-9.

De Freitas Pereira T et al., (2012), 'LBP-TOP Based Countermeasure Against Face Spoofing Attacks,' ACCV'12 Proc 11th International Workshop on Computer Vision with Local Binary Pattern Variants (ACCV), Daejeon, KR, Nov. 5-6, 2012, Lecture Notes in Computer Science, 7728:121-32, Springer-Verlag, Berlin, DE (Pub).

De Freitas Pereira T et al., (2013), 'Can Face Anti-Spoofing Countermeasures Work in a Real World Scenario?,' Proc 2013 International Conference on Biometrics (ICB), Jun. 4-7, 2013, Madrid, ES, IEEE Cat. No. CFP1392R-ART, IEEE Computer Society, Washington, DC (Pub), 1:18.

Evans N. et al., (2015) 'Guest Editorial: Special Issue on Biomettric Spoofing and Countermeasures,' IEEE T Info Forensic Secur, 10(4):699-701.

Galbally J and Marcel S, (2014), 'Image Quality Assessment for Fake Biometric Detection: Application to Iris, Fingerprint, and Face Recognition,' IEEE T Image Process, 23(2):710-24.

Gibert G et al., (2013), 'Face Detection Method Based on Photoplethysmography,' 10th IEEE International Conference on Advanced Video and Signal Based Survellance (AVSS), Aug. 29-30, Krakow, PL, IEEE Cat. No. CPF13AVS-ART; IEEE Computer Society, Piscataway, NJ (Ed), I:449-453.

Hernandez J, (2015), 'Biophone: Physiology Monitoring from Peripheral Smartphone Motions,' 37th Annual Internationl Conference of the IEEE Engineering in Medicine and Biology Society (EMBC), Aug. 25-29, 2015, Milan, Italy, IEEE Computer Society, Washington, DC (Pub), 1:7180-3.

International Search Report and Written Opinion of the International Searching Authority for International Application No. PCT/US2015/023344, dated Sep. 16, 2015 (13 pages).

International Search Report and Written Opinion of the International Searching Authority for International Application No. PCT/US2016/035007, dated Aug. 19, 2016 (10 pages).

International Search Report and Written Opinion of the International Searching Authority for International Application No. PCT/US2017/020166 dated Jun. 8, 2017 (14 pages).

Kollreider K et al., (2007), 'Real-Time Face Detection and Motion Analysis with Application in 'Liveness' Assessment,' IEEE T Info Forensic Secur, 2(3):548-58.

Kose N and Dugelay J-L, (2013), 'Countermeasure for the Protection of Face Recognition Systems Against Mask Attacks,' 10th IEEE International Conference on Automatic Face and Gesture Recognition (FG2013), shanghai, CN, Apr. 22-26, 2013, IEEE Computer Society, Washington, DC (Pub) (6 pages).

Li J et al., (2004), 'Live Face Detection Based on the Analysis of Fourier Spectra,' Proc SPIE: Biometric Technology for Human Identification, Orlando, FL, Apr. 12, 2004, SPIE,k Bellingham, WA (Pub), 5404:296-303.

Marcel S et al., 'Trusted Biometrics under Spoofing Attacks,' accessed on the internet at <http:/www.tabularasa-euproject.org>, downloaded May 24, 2016 (2 pages).

McKerrow PJ and Yoong KK, (2007), 'Classifying Still Faces with Ultrasonic Sensing,' J Robotic Auton Syst, 55(9):702-10.

Miao Z et al., (2009), 'Human Face Classification Using Ultrasonic Sonar Imaging,' Jpn J appl Phys, 48(7):07GC11-1-07GC11-5.

Motorola Mobility, Inc., (2011), 'Motorola Defy+with Motoblur,' retrieved from the internet on Jun. 25, 2015 at https://motorola-

(56) References Cited

OTHER PUBLICATIONS global-en-aus.custhelp.com/ci/fattach/get/588640/1360689155/redirect/1/filename/defy_plus_ug_au_en_6801635501_v3.pdf (70 pages).

Sun L et al., (2007), 'Blinking-Based Live Face Detection Using Conditional Random Fields,' Lecture Notes in Computer Science, Proc International Conference on Advances in Biometrics ICB 2007, Seoul, KR, Aug. 27-29, 2007, SW Lee and SZ Li (Eds), Springer, Berlin, DE (Pub) 4642:252-60.

Tan X et al., (2010), 'Face Liveness Detection from a Single Image with Sparse Low Rank Bilinear Discriminative Model,' 11th European Conference on Computer Vision ECCV 2010, Crete, GR, Sep. 5-11, 2010, *Lecture Notes in Computer Science*, 6316:504-17.

Wang W et al., (2015), 'Exploiting Spatial Redundancy of Image Sensor for Motion Robust rPPG,' IEEE T Bio-Med Eng, 62(2):415-25.

Wen D et al., (2015), 'Face Spoof Detection with Image Distortion Analysis,' IEEE T Info Forensic Secur, 10(4):746-61.

Zhang Z et al., (2012), 'A Face Antispoofing Database with Diverse Attacks,' 5th IAPR International Conference on Biometrics (ICB), New Delhi, IN, Mar. 29-Apr. 1, 2012, IEEE Computer Society, Washington, DC (Pub) (6 pages).

Miao et al, "Human Face Classification Using Ultrasonic Sonar Imaging," 2009, Japanese Journal of Applied Physics 48, 5 pages.

Neslihan Kose et al., "Countermeasure for the Protection of Face Recognition Systems Against Mask Attacks", 2003 10th IEEE International Conference and Workshops on Automatic Face and Gesture Recognition (FG), (Apr. 1, 2013), pp. 1-6.

SPOOF DETECTION USING PROXIMITY SENSORS

CROSS-REFERENCE TO RELATED APPLICATION

This application is a continuation of U.S. patent application Ser. No. 15/446,564, filed on Mar. 1, 2017, and entitled "Spoof Detection Using Proximity Sensors," which claims priority to and the benefit of U.S. Provisional Patent Application No. 62/302,526, filed on Mar. 2, 2016, and entitled "Spoof Detection Using Proximity Sensors," the entireties of which are incorporated by reference herein.

TECHNICAL FIELD

The present disclosure generally relates to spoof detection and, in particular, to systems and methods for detecting whether a subject is being spoofed using a proximity sensor.

BACKGROUND

It is often desirable to restrict access to property or resources to particular individuals. Biometric systems can be used to authenticate the identity of an individual in order to either grant or deny access to a resource. For example, iris scanners can be used by a biometric security system to; identify an individual based on unique structures in the individual's iris. Such a system can erroneously authorize an impostor, however, if the impostor presents for scanning a pre-recorded image or video of the face or eye of an authorized person. Such a fake image or video can be displayed on a monitor such as a cathode ray tube (CRT) or liquid crystal display (LCD) screen, in glossy photographs, as a three-dimensional printed model, and so on, held in front of a camera used for scanning. Some so-called spoof-detection systems can detect a fake image by ascertaining eye movement. But such a system may not be effective in identifying a fake video that includes the expected movement of the eye. Improved systems and methods are therefore needed for efficiently determining fake images and videos from those provided live by the authorized persons.

SUMMARY

In various implementations described herein, the detection of physical properties indicating the presence of a live person is used to distinguish live, authentic faces from images/videos and other spoofed and fraudulent authentication methods. Accordingly, a computer-implemented method for spoof detection includes the operations of receiving one or more reflective strength readings from a proximity sensor; determining a first liveness measure based on the one or more readings and a reflection threshold; and determining whether a target in range of the proximity sensor is likely to be a live human based at least in part on the first liveness measure. Other aspects of the foregoing include corresponding systems and computer programs.

Various implementations of these aspects can include the following. The proximity sensor includes a photoelectric sensor, a capacitive sensor, or an acoustic sensor. The proximity sensor is incorporated in a mobile device having an image sensor. The operations further include receiving one or more images of at least a portion of a face of the target; determining an subject-to-screen distance based on the received one or more images; and normalizing a particular reflective strength reading according to the subject-to-screen distance to determine the reflection threshold. The subject-to-screen distance is determined based on at least one of an interocular distance in the one or more images and a round-trip delay of a signal emitted from a device. The operations further include accepting the target if the target is determined likely to be a live human, and rejecting the target if the target is determined unlikely to be a live human. Accepting the target includes permitting a biometric verification to continue, and rejecting the target can include failing the biometric verification. The operations further include identifying a false rejection of the target; and adjusting the reflection threshold based on the identification. Determining whether the target is likely to be a live human is further based at least in part on a second liveness measure. The second liveness measure is based on a challenge response.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Described in the present application, in various implementations, is a liveness detection and anti-spoofing technology using data from a proximity sensor. As used herein, "liveness" refers to characteristics tending to indicate the presence of a live person. Such characteristics can include, for example, recognizable physical features such as skin, a human face, or eyes, and properties associated with the foregoing, such as the expected reflectiveness and absorption of skin and/or underlying tissue, organs, and the like.

Figure 1B:
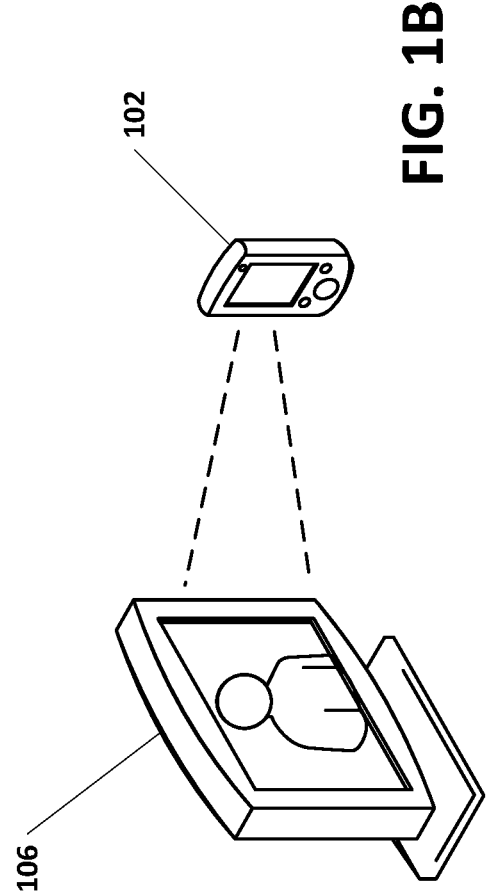
FIGS. 1A-1B depict various use cases for spoof detection.
Figure 1A:
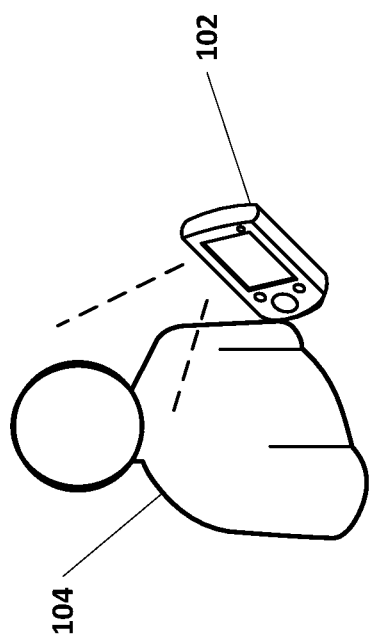

FIG. 1A-1B illustrate various use cases for spoof detection as described herein. For example, in FIG. 1A, a target user 104 uses his mobile device 102 (e.g., smartphone, tablet, etc.) to authenticate himself using a biometric reading (e.g., eye scan) captured by the mobile device camera. In addition to the camera, the mobile device 102 can utilize other sensors, such as a photoelectric sensor, acoustic sensor, capacitive sensor, accelerometer, gyroscope, fingertip heartbeat sensor, vibration sensor, and the like in order to verify the physical presence of the user. In FIG. 1B, the mobile device 106 captures an image or video of a target on an LCD monitor 106 or other display screen. Software executing on the mobile device 102 can determine that the target is not physically present using, for example, electromagnetic, photic, acoustic, or other reflection measurements received from a proximity sensor incorporated in the mobile device 102.

Figure 2:
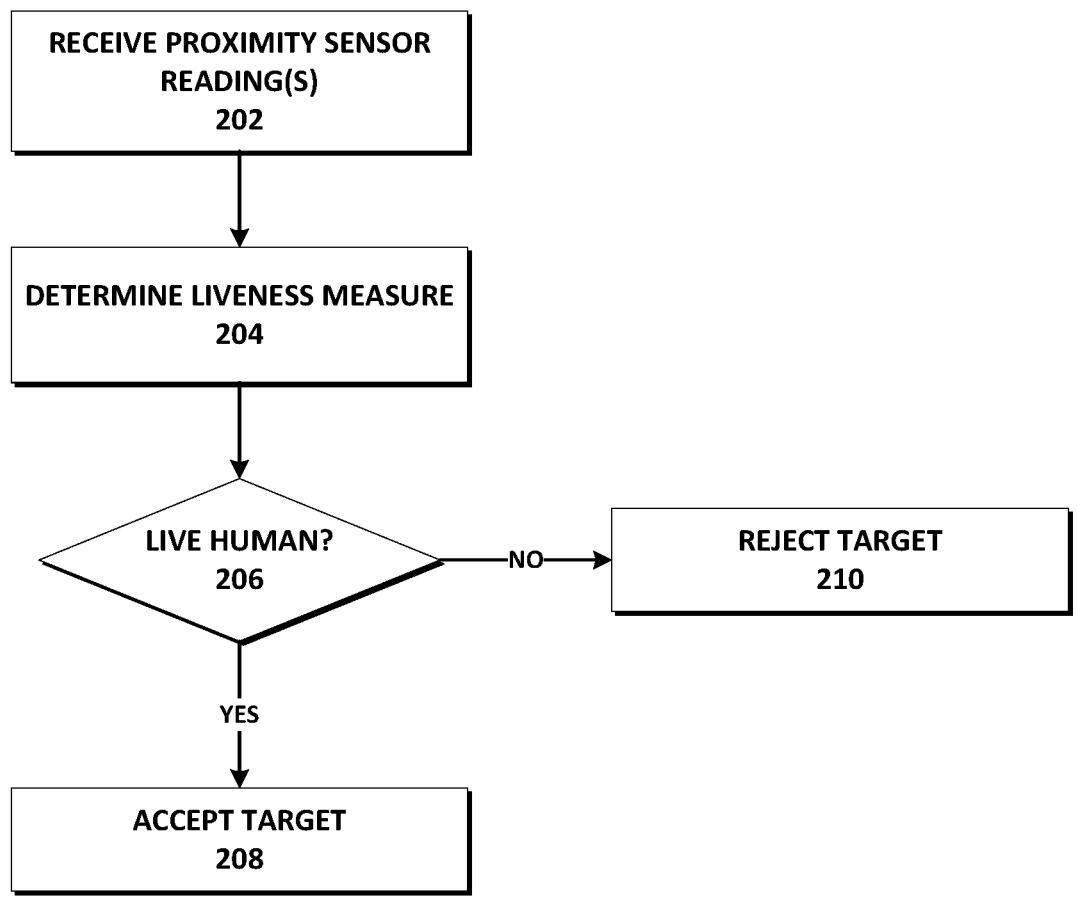
FIG. 2 depicts a method for spoof detection according to an implementation.

One implementation of a method for spoof detection is depicted in FIG. 2. In general, a device (e.g., a cell phone, smartphone, tablet, etc. used in a typical biometrically enhanced user interaction, such as logging in to a banking app while using biometric eye verification) detects if a live human is likely to be positioned in range of a device sensor, such as a photoelectric proximity sensor located on the front of mobile device. Various types of photoelectric sensors can be utilized separately or in combination, and can include, for example, infrared (IR) sensors, laser-based sensors, and the like. Such photoelectric sensors are often used to detect when the user's face is near a touchscreen when a call is being made so that the screen can be turned off or locked, thereby preventing accidental interactions with the screen. Although many of these proximity sensors are initially tuned to be maximally sensitive at closer ranges (a few inches of range), their range settings can be adjusted by, for example, writing new values into their emission strength shift register for better spoof detection at longer distances.

Accordingly, in STEP 202, one or more readings are received from the proximity sensor. The readings can be, for example, reflective strength readings based on signals (e.g., IR, laser-based, etc.) bouncing off a target (e.g., a human, inanimate object, or otherwise). At typical scanning distances, certain proximity sensor skin reflection strengths (e.g., face reflection strengths from IR signals) are different (lower) than reflections from printouts, screens, and other reproductions. This is a result of the manner in which live skin and human facial tissue absorbs and reflects such waves compared to, for example, inanimate objects, especially printouts and screens that are usually used for playing back spoof images to fool biometric scanners (e.g., eye measurements, facial recognition, etc.). In STEP 204, a liveness measure is determined based on the sensor readings (or an average or other value derived from the sensor readings). The liveness measure can be determined by, for example, comparing reflection information derived from the sensor readings with a reflection threshold. If the reflection information meets or exceeds the threshold while the target is at certain operational distance, the target is less likely to be a live human. If the threshold is not met, the target is more likely to be a live human. The reflection strength itself, normalized by distance, can be used as the likelihood of presence of spoof. Given this liveness measure (and, in some instances, other liveness measures), a determination can be made whether the target is a live human (STEP 206). If the target is determined likely to be a live human, the target can be accepted (STEP 208) and, in some instances, further verification steps and/or spoof detection measures can commence. Otherwise, the target is rejected (STEP 208).

In one implementation, the reflectiveness threshold can be calibrated according to a particular target user and/or device. For example, during an enrollment process, the interocular distance (e.g., interpupillary distance) of the target user can be determined from captured images/video in order to estimate the distance of the user from the capturing device (i.e., standoff distance). Other methods of determining subject-to-screen distance are also contemplated, such as evaluating the round-trip delay of a high frequency ping sent through an earpiece or front-facing speakers while the user is looking at his device. Thus, based on the perceived determined subject-to-screen distance, the reflectiveness threshold can dynamically be set to a value that represents approximately the expected reflectivity value given the user's physical characteristics and the hardware characteristics of the capturing device (which can affect the distance the user must be from the device in order to engage in an enrollment or verification process). For instance, using a Samsung Galaxy Note 4, the values registered by the analog to digital converter (ADC) for the IR proximity sensor at 15 and 20 cm standoff distance for real live face, printed face, and LCD-displayed face are (7,6), (30,22), and (16,12), respectively. Thus, by setting the spoof threshold to 8 (and possibly lowering it for farther standoff distances), one can detect printout and monitor-displayed spoofs. Identifying the standoff distance via determining the interocular distance or other suitable technique can also be used in verification (because IR and other types of signal reflectivity strength changes with distance).

More specifically, the threshold can be determined based on the subject-to-screen distance (e.g., perceived interocular distance) by using a reflection strength curve of the proximity sensor, which is generally a function of distance from an object and the type of the object. This reflection strength curve can also be estimated using curve fitting through multiple distance measurements at the time of enrollment by the real target user. For instance, the values registered by the ADC of the IR proximity sensor can be measured during real user enrollment at various standoff distances, for example, from 15 to 45 cm for every 5 cm. The corresponding proximity sensor reflection strength curve can then be obtained by regression methods, such as piecewise linear or spline methods of interpolation and curve fitting using the aforementioned measured samples. In some instances, the strength of the photoelectric emitter of the proximity sensor can be increased during anti-spoofing operations to increase range and sensitivity.

In some implementations, pre-processing and calibration can include the following operations. Proximity sensor readouts during each liveness test period (when the target user is scanning her eyes and/or face for biometric authentication) can be de-noised using low pass/running average/ median filtering or wavelet de-noising. Classifiers such as Mahalanobis can be used to derive a liveness score based on statistics of the target user's proximity sensor measurements at the time of enrollment. Classifier parameters can also be further tuned should the proximity sensor liveness measure provide a false positive or a false negative, but a secondary liveness fallback measure (such as a challenge response) confirms liveness or lack of liveness. New parameters/ profiles can also be recalled adaptively whenever specific circumstances (e.g., environmental conditions such as strong daylight, target characteristics such as the presence of eyeglasses, etc.) are identified. As a result, the liveness measure can learn and improve its behavior over time. For instance, during intense daylight where natural ambient IR is higher, computer vision algorithms can be deployed to flag the circumstance and increase the threshold accordingly (or increase the proximity sensor's IR emitter level to overcome ambient IR). In another example, if the user is wearing large glasses that excessively reflect back IR to the proximity sensor, a computer vision algorithm can be used to detect the presence of those glasses and increase the threshold accordingly (the new threshold can be learned based on the reflectivity of those glasses after confirming the liveness by a fallback measure such as challenge response the first time this circumstance is encountered).

Various other techniques can be used to determine liveness in combination with or as a fallback for the proximity sensor technique described herein, such as those techniques described in U.S. patent application Ser. No. 14/480,802, filed on Sep. 9, 2014, and entitled "Systems and Methods for Liveness Analysis," the entirety of which is incorporated by reference herein. Other techniques include verifying the presence of a three-dimensional face-like structure and measuring the pulse of the target using multiple sources. Three-dimensional face sensing can be performed using face-surface modulated sound reflections (e.g., from coded high-pitched probe signals from a phone earpiece similar to sonar) and/or structured light reflections (e.g., from fast patterned illuminations from a phone screen enabling photometric stereo). A user's pulse can be measured from heart pumping action that induces face color changes and hand vibrations.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and can interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and can interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving one or more reflective strength readings from a proximity sensor of a device;
   determining a distance between the device and a target in range of the proximity sensor;
   normalizing the one or more reflective strength readings according to the determined distance to determine a reflection threshold;
   determining a liveness measure based on the one or more readings and the reflection threshold; and
   determining whether the target is likely to be a live human based at least in part on the liveness measure.

2. The method of claim 1, wherein the proximity sensor comprises a photoelectric sensor, a capacitive sensor, or an acoustic sensor.

3. The method of claim 1, wherein the device comprises a mobile device having an image sensor.

4. The method of claim 1, wherein determining a distance between the device and a target in range of the proximity sensor comprises:
   receiving one or more images of at least a portion of a face of the target; and
   determining the distance based on the received one or more images.

5. The method of claim 4, wherein the distance is determined based on an interocular distance in the one or more images.

6. The method of claim 1, wherein determining a distance between the device and a target in range of the proximity sensor comprises:
   emitting a signal from the device; and
   determining the distance based on a round-trip delay of the signal.

7. The method of claim 6, wherein the signal comprises a high-frequency ping emitted from an earpiece or speaker of the device.

8. The method of claim 1, further comprising accepting the target if the target is determined likely to be a live human, and rejecting the target if the target is determined unlikely to be a live human.

9. The method of claim 8, further comprising:
   identifying a false rejection of the target; and
   adjusting the reflection threshold based on the identification.

10. The method of claim 1, wherein the proximity sensor comprises an infrared sensor, and wherein determining the liveness measure comprises evaluating whether the one or more reflective strength readings are representative of a strength of reflection of infrared light from human skin or tissue as compared to a strength of reflection of infrared light from a spoof.

11. A system comprising:
    at least one processor; and
    at least one memory storing computer-executable instructions that, when executed, configure the at least one processor to perform operations comprising:
      receiving one or more reflective strength readings from a proximity sensor of a device;
      determining a distance between the device and a target in range of the proximity sensor;
      normalizing the one or more reflective strength readings according to the determined distance to determine a reflection threshold;
      determining a liveness measure based on the one or more readings and the reflection threshold; and
      determining whether the target is likely to be a live human based at least in part on the liveness measure.

12. The system of claim 11, wherein the proximity sensor comprises a photoelectric sensor, a capacitive sensor, or an acoustic sensor.

13. The system of claim 11, wherein the device comprises a mobile device having an image sensor.

14. The system of claim 11, wherein determining a distance between the device and a target in range of the proximity sensor comprises:
    receiving one or more images of at least a portion of a face of the target; and
    determining the distance based on the received one or more images.

15. The system of claim 14, wherein the distance is determined based on an interocular distance in the one or more images.

16. The system of claim 11, wherein determining a distance between the device and a target in range of the proximity sensor comprises:
    emitting a signal from the device; and
    determining the distance based on a round-trip delay of the signal.

17. The system of claim 16, wherein the signal comprises a high-frequency ping emitted from an earpiece or speaker of the device.

18. The system of claim 11, wherein the operations further comprise accepting the target if the target is determined likely to be a live human, and rejecting the target if the target is determined unlikely to be a live human.

19. The system of claim 18, wherein the operations further comprise:
   identifying a false rejection of the target; and
   adjusting the reflection threshold based on the identification.

20. The system of claim 11, wherein the proximity sensor comprises an infrared sensor, and wherein determining the liveness measure comprises evaluating whether the one or more reflective strength readings are representative of a strength of reflection of infrared light from human skin or tissue as compared to a strength of reflection of infrared light from a spoof.

\* \* \* \* \*